3,213,130
SULFONIC ACID SALTS OF SULFONYL HYDRAZINES

Albert Langemann, Basel, and Paul Zeller, Allschwil, Switzerland, assignors to Hoffmann-La Roche Inc., Nutley, N.J., a corporation of New Jersey
No Drawing. Filed Nov. 16, 1961, Ser. No. 152,918
Claims priority, application Switzerland, Nov. 25, 1960, 13,249/60
7 Claims. (Cl. 260—501)

This invention relates to hydrazine compounds and methods for their preparation. More particularly, the invention relates to organic sulfonic acid addition salts of sulfonyl hydrazines. Specifically the acid addition salts of the invention are compounds of the formula

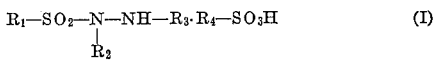
(I)

where $R_1$ is selected from the group consisting of alkyl, aryl, aralkyl, lower alkylaryl and lower alkylaralkyl; one of $R_2$ and $R_3$ is hydrogen and the other is aralkyl; and $R_4$ is selected from the group consisting of alkyl, aryl, aralkyl, haloaryl, haloaralkyl, nitroaryl, nitroaralkyl, hydroxyaryl, hydroxyaralkyl, alkylaryl, alkylaralkyl carboxyaryl and carboxyaralkyl.

The term defining the substituent denoted $R_1$ in the above formula have the following meaning; alkyl includes both straight and branched chain alkyl, for example, lower alkyl groups such as methyl, ethyl, propyl, isopropyl, n-butyl, and the like; aryl includes groups such as phenyl, naphthyl, and the like; and aralkyl includes phenyl-lower alkyl groups such as benzyl, 1-phenylethyl, 1-methyl-2-phenylethyl, 1-methyl-1-phenylethyl, and the like. The aryl and aralkyl groups can in turn be nuclearly substituted by lower alkyl groups, such as methyl or ethyl, and such are exemplary of lower alkylaryl and lower alkylaralkyl. Suitable representatives of $R_2$ and $R_3$, besides hydrogen, are aralkyl, for example, phenyl-lower alkyl groups as benzyl, 1-phenylethyl, 1-benzylethyl, and the like. The substituent $R_4$ is preferably lower alkyl, such as methyl, ethyl, propyl, or pentyl, or a phenyl radical unsubstituted or bearing a substituent such as halogen, nitro, hydroxy, lower alkyl, or carboxy.

It is known that sulfonic acid hydrazides of the formula $$R_1-SO_2-N-NH-R_3$$
$$|$$
$$R_2$$
(II)

wherein $R_1$, and $R_2$ and $R_3$ have the same meaning as above possess significant activity as nonamine oxidase inhibitors. It has, however, also been found that these compounds are relatively unstable, undergoing gradual decomposition even at room temperature, in neutral or basic media. Because of this instability, successful pharmaceutical compounding of the above sulfonyl hydrazides has been precluded. Preparations which must undergo storage for any length of time, especially at higher temperature, when called upon for use, have been found not to contain the desired active material in the original intended dose, whereby controlled dosing is made extremely difficult.

The instant invention is based on the discovery that the decomposition of the above sulfonic acid hydrazides can be prevented by preparing addition compounds of these substances with organic sulfonic acids. On the other hand, it has been found that these aforesaid addition compounds are easily hydrolyzed in the body, so that the activity of the sulfonic acid hydrazide is made available upon administration of the addition compound. Further the addition compounds of the invention represent stable crystalline substances which can be put in dry storage or in suitable pharmaceutical application forms.

The addition compounds of the invention can be prepared by reaching a sulfonic acid hydrazide of the formula

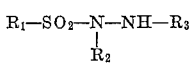

wherein $R_1$, $R_3$, and $R_2$ have the same meaning as above with a sulfonic acid of the formula (III)          $R_4-SO_3H$ wherein $R_4$ has the same meaning as above. The above reaction can be conducted with or without use of a solvent. If a solvent is used, dependent upon the particular solvent chosen, the addition compound can be directly crystallized from the reaction mixture or its separation therefrom can be effected by the addition of a precipitant and subsequent drying. As solvents, acetonitrile, chloroform, and ether have been found to be especially suitable. However, other solvents can also be used, for example, benzene, acetic acid, dimethylformamide, dimethylsulfoxide, or mixtures of such. Suitably the sulfonic acid hydrazide is reacted with at least the stoichiometric amount of the sulfonic acid. As organic sulfonic acids, there are advantageously used those with form pharmaceutically compatible well-defined crystalline salts. As exemplary of such sulfonic acids, there can be named the following: lower alkyl sulfonic acids such as methane sulfonic acid, ethane sulfonic acid, propane sulfonic acid, pentane sulfonic acid, and the like; aryl sulfonic acids, for example, phenyl sulfonic acids such as phenyl sulfonic acid, p-toluene sulfonic acid, p-chlorophenyl sulfonic acid, p-nitrophenyl sulfonic acid, sulfosalicylic acid, and the like; and aralkyl sulfonic acids, for example, phenyl-lower alkyl sulfonic acids such as benzyl sulfonic acid, phenyl-ethyl sulfonic acid, and the like.

The addition compounds of the invention can be employed as medicaments in the form of pharmaceutical preparations which contain in mixture with the addition compounds of the invention pharmaceutically inert carrier materials, especially those adapted for oral administration, such as for example gelatin, lactose, starch, magnesium stearate, talc, barium sulfate, vegetable oils, gums, vaseline, cholesterol, and the like. Pharmaceutical preparations can be in conventional pharmaceutical forms with dosage adjusted to individual requirements, for example, tablets, dragees, suppositories, pills, capsules, suspensions, and emulsions. If desired, they can be subjected to conventional pharmaceutical preparatory operations, such as sterilization and the like, and can contain conventional pharmaceutical assistants, such as preservatives, stabilizers, wetting agents, or emulsifying agents. They can also contain still other therapeutically active materials.

The following examples are illustrative of the invention but not limitative thereof. All temperatures are stated in degree centigrade.

EXAMPLE 1

*Methane sulfonic acid $N^1$-p-toluenesulfonyl-$N^1$-benzylhydrazine*

(a) 300 ml. of acetonitrile were heated to 75°; and there was then added thereto 50 g. of $N^1$-p-toluenesulfonyl- $N^1$-benzylhydrazine (M.P. 136°), and the mixture heated on a steam bath for approximately 2 minutes until all of the material was dissolved. To the resulting clear weakly yellow solution there was added 20 g. of methane sulfonic acid dissolved in 80 ml. of acetonitrile, and the temperature of the reaction mixture was decreased to about 5° by cooling on an ice bath with stirring for 15 minutes, whereupon a dense precipitate of colorless fine needles formed. This precipitate was filtered off and washed with 50 ml. of acetonitrile and 50 ml. of absolute ether. The product was thus obtained as colorless fine needles melting at 139–141° (decomposition).

(b) A solution of 100 g. of $N^1$-p-toluenesulfonyl-$N^1$-benzylhydrazine in 650 ml. of acetonitrile was heated on a steam bath for about 5 minutes. To the resulting clear solution there was added 50 g. of methane sulfonic acid dissolved in 50 ml. of acetonitrile, and the resulting mixture was then cooled in an ice bath with stirring. After about 10 minutes, the precipitated colorless needles were filtered off and washed with 100 ml. of acetonitrile and 100 ml. of absolute ether. The product was thus obtained as colorless fine needles melting at 139–141° (decomposition).

(c) 2.7 g. of $N^1$-p-toluenesulfonyl-$N^1$-benzylhydrazine was dissolved in 25 ml. of dimethylformamide at room temperature, and then, with stirring, mixed with 1.2 g. of methane sulfonic acid, whereupon the temperature of the reaction mixture increased. Upon the addition of 100 ml. of absolute ether, colorless needles precipitated, which were filtered off with suction. The product was thus obtained as crystals melting at 136–139° (decomposition).

(d) 50 g. of $N^1$-p-toluenesulfonyl-$N^1$-benzylhydrazine were dissolved with stirring at room temperature in a mixture of 15 g. of methane sulfonic acid and 20 ml. of acetonitrile and with continued stirring gradually mixed with an additional 40 ml. of acetonitrile, whereupon small colorless needles precipitated. 40 ml. of absolute ether were then added to the mixture, and the resulting voluminous precipitate filtered off with suction and washed with 10 ml. of acetonitrile and 10 ml. of absolute ether. The product was thus obtained as colorless needles melting at 142–143.5° (decomposition).

(e) 10 g. of $N^1$-p-toluenesulfonyl-$N^1$-benzylhydrazine were dissolved in 100 ml. of chloroform at 35° and mixed, with stirring, with a suspension of 4 g. of methane sulfonic acid and 10 ml. of chloroform, whereupon the temperature of the solution increased slightly. The solution was then cooled to 5°, and colorless needles precipitated. There was then added, with stirring, 50 ml. of absolute ether, and the voluminous precipitate which formed was filtered off and washed with 10 ml. of absolute ether. The product was thus obtained as colorless needles melting at 138–140° (decomposition).

(f) 5 g. of $N^1$-p-toluenesulfonyl-$N^1$-benzylhydrazine were dissolved in 50 ml. of acetic acid by stirring for approximately 2 minutes at 80°. To the resulting weakly yellow solution there was added 2.5 g. of methane sulfonic acid in 5 ml. of acetic acid, and the resulting solution was then diluted with 100 ml. of absolute ether. The resulting precipitate was filtered off and washed with 10 ml. of absolute ether. The product was thus obtained as colorless needles melting at 134–137° (decomposition).

EXAMPLE 2

*p-Toluene sulfonic acid $N^1$-p-toluenesulfonyl-$N^1$-benzylhydrazine*

5 g. of $N^1$-p-toluenesulfonyl-$N^1$-benzylhydrazine were dissolved in 50 ml. of acetonitrile by rapid heating on a steam bath and then mixed with a solution of 5 g. of p-toluene sulfonic acid and 50 ml. of acetonitrile, whereupon a voluminous precipitation occurred. The precipitate was filtered off and washed with 20 ml. of acetonitrile followed by 20 ml. of absolute ether. The product was thus obtained as fine colorless needles melting at 150–153° (decomposition).

EXAMPLE 3

*Ethane sulfonic acid $N^1$-p-toluenesulfonyl-$N^1$-benzylhydrazine*

5 g. of $N^1$-p-toluenesulfonyl-$N^1$-benzylhydrazine were dissolved in acetonitrile in the same manner as described in Example 2. The resulting clear solution was then mixed with 5 g. of ethane sulfonic acid and 25 ml. of acetonitrile, and the resulting precipitate worked up as described in Example 2. The product was thus obtained as fine colorless needles melting at 136–138° (decomposition).

EXAMPLE 4

*Sulfosalicylic acid $N^1$-p-toluenesulfonyl-$N^1$-benzylhydrazine*

The product was prepared according to the method described in Example 2 from 5 g. of $N^1$-p-toluenesulfonyl-$N^1$-benzylhydrazine and 5 g. of sulfosalicylic acid. The product was thus obtained as colorless needles melting at 145° (decomposition).

EXAMPLE 5

*Methane sulfonic acid $N^1$-benzylsulfonyl-$N^1$-benzylhydrazine*

(a) 5 g. of $N^1$-benzylsulfonyl-$N^1$-benzylhydrazine were dissolved in 70 ml. of acetonitrile and the resulting solution mixed with a solution of 2.5 g. of methane sulfonic acid and 5 ml. of acetonitrile. The voluminous precipitate which resulted was filtered off and washed with 10 ml. of acetonitrile and 10 ml. of absolute ether. The product was thus obtained as fine colorless needles melting at 109–111° (decomposition).

(b) 5 g. of $N^1$-benzylsulfonyl-$N^1$-benzylhydrazine were dissolved in a mixture of 10 g. of methane sulfonic acid and 10 ml of acetonitrile at room temperature and the so-obtained mixture then mixed with stirring with 40 ml. of acetonitrile. The resulting solution was mixed with 50 ml. of absolute ether, the resultant precipitated needles filtered off and further purified via washing with 10 ml. of acetonitrile and 10 ml. of absolute ether. The product was thus obtained as colorless fine needles melting at 109–111° (decomposition).

EXAMPLE 6

*p-Toluene sulfonic acid $N^1$-benzylsulfonyl-$N^1$-benzylhydrazine*

5 g. of $N^1$-benzylsulfonyl-$N^1$-benzylhydrazine were dissolved in 50 ml. of acetonitrile at room temperature and mixed with a solution of 4.7 g. of p-toluene sulfonic acid and 20 ml. of acetonitrile. The resulting precipitate was filtered off and washed with 10 ml. of acetonitrile and 10 ml. of absolute ether. The product was thus obtained as colorless fine needles melting at 146–148° (decomposition).

We claim:

1. A compound of the formula:

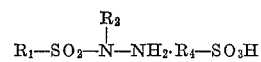

wherein $R_1$ is selected from the group consisting of phenyl-lower alkyl, lower alkyl-phenyl and phenyl; $R_2$ is phenyl-lower alkyl and $R_4$ is selected from the group consisting of alkyl, aryl, aralkyl, haloaryl, haloaralkyl, nitroaryl, nitroaralkyl, hydroxyaryl, hydroxyaralkyl, alkylaryl, alkylaralkyl, carboxyaryl and carboxyaralkyl.

2. The lower alkyl sulfonic acid salt of $N^1$-p-toluenesulfonyl-$N^1$-benzylhydrazine.
3. The methane sulfonic acid salt of $N^1$-p-toluenesulfonyl-$N^1$-benzylhydrazine.
4. The p-toluene sulfonic acid salt of $N^1$-p-toluenesulfonyl-$N^1$-benzylhydrazine.
5. The ethane sulfonic acid salt of $N^1$-p-toluenesulfonyl-$N^1$-benzylhydrazine.
6. The methane sulfonic acid salt of $N^1$-benzlysulfonyl-$N^1$-benzylhydrazine.
7. The p-toluene sulfonic acid salt of $N^1$-benzylsulfonyl-$N^1$-benzylhydrazine.

References Cited by the Examiner

UNITED STATES PATENTS

| | | | |
|---|---|---|---|
| 2,182,075 | 12/39 | Ebert | 260—501 |
| 2,229,127 | 1/41 | Raiziss et al. | 260—501 |
| 3,042,721 | 7/62 | Gardner et al. | 260—501 X |
| 3,065,136 | 11/62 | Stenvall et al. | 260—501 X |

FOREIGN PATENTS 821,423  11/51  Germany.

LORRAINE A. WEINBERGER, *Primary Examiner.*

LEON ZITVER, *Examiner.*

UNITED STATES PATENT OFFICE
CERTIFICATE OF CORRECTION

Patent No. 3,213,130

October 19, 1965

Albert Langemann et al.

It is hereby certified that error appears in the above numbered patent requiring correction and that the said Letters Patent should read as corrected below.

Column 1, line 50, for "$R_1$, and $R_2$ and $R_3$" read -- $R_1$, $R_2$ and $R_3$ --; line 51, for "nonamine" read -- monoamine --; column 2, line 8, for "reaching" read -- reacting --; line 30, for "with" read -- which --; column 4, line 41, for "5 g. of N.$^1$-benzylsulfonyl-" read -- 5 g. of $N^1$-benzylfonyl --.

Signed and sealed this 4th day of October 1966.

(SEAL)
Attest:

ERNEST W. SWIDER
Attesting Officer

EDWARD J. BRENNER
Commissioner of Patents